United States Patent [19]

Watanabe et al.

[11] Patent Number: 5,035,560

[45] Date of Patent: Jul. 30, 1991

[54] CLIP

[75] Inventors: Koji Watanabe, Aichi; Hiromichi Nakayama; Kunihiro Fukuhara, both of Toyota, all of Japan

[73] Assignee: Nifco, Inc., Japan

[21] Appl. No.: 315,945

[22] Filed: Feb. 27, 1989

[30] Foreign Application Priority Data

Sep. 24, 1987 [JP] Japan .................... 62-145702

[51] Int. Cl.$^5$ .................................... F16B 19/00
[52] U.S. Cl. ...................... 411/508; 411/908; 411/913
[58] Field of Search ........... 411/908, 508, 439, 509, 411/510, 907, 182, 913, 901, 903, 44; 24/297, 453

[56] References Cited

U.S. PATENT DOCUMENTS

| | | | |
|---|---|---|---|
| 2,983,008 | 5/1961 | Rath | 411/908 X |
| 2,984,877 | 5/1961 | Perrochat | 411/908 X |
| 3,029,486 | 4/1962 | Raymond | 411/908 X |
| 3,894,466 | 7/1975 | Wibrow | 411/900 X |
| 4,524,494 | 6/1985 | Sato et al. | 411/913 X |
| 4,840,522 | 6/1989 | Kurihara | 411/908 X |

FOREIGN PATENT DOCUMENTS

61-32809  2/1986  Japan .
63-19917  8/1988  Japan .

Primary Examiner—Rodney M. Lindsey
Attorney, Agent, or Firm—Oliff & Berridge

[57] ABSTRACT

A clip for attaching an ornamental member to a wall member such as a vehicle body panel. The clip has a head continuously connected with a portion locking the ornamental member. The head is pressed against one surface of the wall member. The clip also has a leg extending from the head and is inserted into a through hole in the wall member. Pawls are formed at a maximum diameter portion of the leg and pressed against the other surface of the wall member to fixedly hold the leg onto the wall member. Pliable thin-walled resin is coated through secondary forming around the respective outer peripheries of the pawls and the leg for preventing damage of an inner periphery of the through hole when the leg is inserted into the through hole.

2 Claims, 6 Drawing Sheets

CLIP

FIELD OF THE INVENTION

The present invention relates to a clip used for attachment of automobile parts or the like.

DESCRIPTION OF THE RELATED ART

In automobiles, clips are employed to attach various types of parts.

Such clips have legs each provided with pawls and extending downwardly from a respective head. This type of clip is attached to a body panel by inserting the leg into an attachment hole in the body panel with the distal end of the leg directed ahead. The pawls are forced to advance past the attachment hole by flexing them temporarily, so that after passage through the attachment hole, the pawls are allowed to restore to their original shape for clamping a peripheral edge of the attachment hole between the head and the pawls. Thus, an automobile part previously attached to the clip is now attached onto the body panel.

Figure 13:
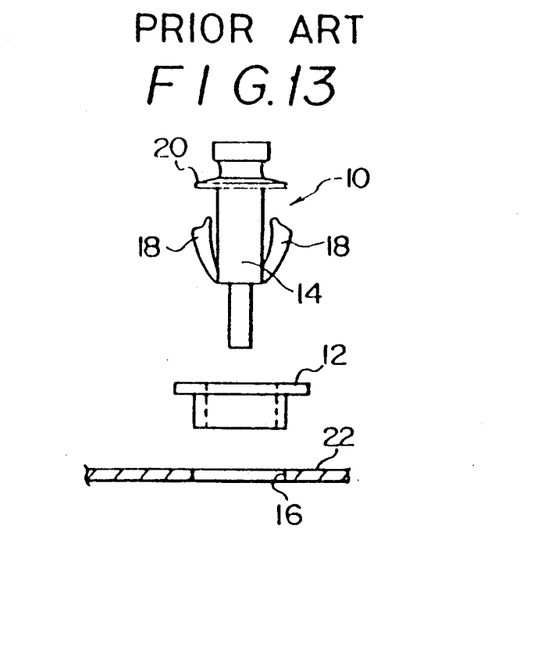
FIG. 13 is a front view.
Figure 14:
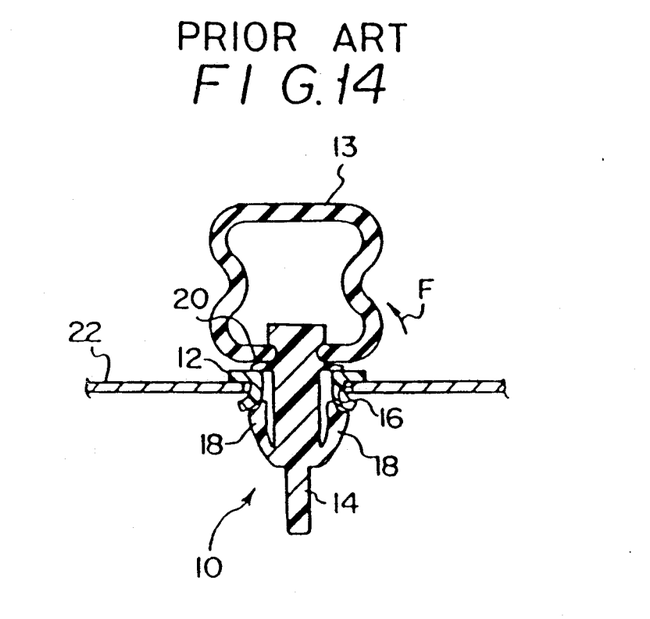
FIG. 14 is a sectional view showing a state where a weather stripping is attached to a body panel using a clip and a cap both shown in FIG. 13.

When automobile parts are attached to the body panel using clips, it rust-proof coating film on the body panel is required to protect against damage. To this end, in case of attaching weather stripping by means of clips, for example, a clip 10 has conventionally been used in combination with a cap 12, as shown in FIGS. 13 and 14, for the attachment of weather stripping 13 (shown in FIG. 14). The cap 12, made of soft resin, is fitted onto leg 14 of the clip 10 before the leg 14 is inserted through the attachment hole 16, so that the insertion of the leg 14 through the attachment hole 16 does not damage any coating film on an inner peripheral wall of the attachment hole 16.

However, when the cap 12 is employed as mentioned above, the leg 14 of the clip 10 comes into sliding contact with the cap 12 during insertion of the leg 14 through the attachment hole 16, and the cap 12 resists against the insertion of the leg 14 through the attachment hole 16. Because the cap 12 is made of soft resin, the development of resistance becomes particularly great. In this state there occurs no substantial change in the force needed for the insertion of the leg 14 into the attachment hole 16 at the time the pawls 18 are restored to their original shape after passing through the attachment hole 16. This tends to impair a "click feeling" that should be produced during insertion of the clip 10.

Also, the cap 12 has a relatively thick wall. Therefore, if the clip 10 is subjected to a twisting or pinching force acting in the direction of arrow F in FIG. 14 after the attachment of the clip 10 to the body panel 22, the twisting force will cause the pawl 18, on one side, to deform the cap 12 in direction of the thickness of the cap or the wall thereof. Hence, the clip 10 will be liable to disengage from its clamped state onto the body panel 22. This results in the reduced strength of attachment of the clip 10 to the body panel 22.

SUMMARY OF THE INVENTION

In view of the foregoing, it is an object of the present invention to provide a clip which can be attached to an attachment member, such as a body panel, without damaging a coating film on the attachment member and which can produce a positive "click feeling" when attaching the clip to the attachment member, thereby being assured of a high strength of attachment of the clip to the attachment member.

The present invention is directed to a clip which has a leg provided with pawls extending downwardly from a head. The clip is attached to an attachment member by inserting the leg through an attachment hole in the attachment member so as to clamp a peripheral edge of the attachment hole by the head and the pawls, wherein a thin-wall surrounding portion made of soft resin and immovable in the direction of extension of the leg is provided around the outer periphery of the leg through secondary forming.

With such a of the present invention, by inserting the leg through the attachment hole, the peripheral edge of the attachment hole is clamped between the head and the pawls, thereby tightly attaching the clip to the attachment member. During the insertion of the leg through the attachment hole, the thin-walled surrounding portion, made of soft resin and immovable in the direction of extension of the leg, comes into contact with an inner peripheral wall of the attachment hole in order to prevent a coating film on the inner peripheral wall of the attachment hole from being damaged.

BRIEF DESCRIPTION OF THE DRAWINGS

FIGS. 1 to 6 illustrate a first embodiment of a clip according to the present invention in which:

FIGS. 7 to 12 illustrate a second embodiment of a clip according to the present invention in which:

FIGS. 13 and 14 illustrate the structure of a conventional clip in which;

DETAILED DESCRIPTION OF THE PREFERRED EMBODIMENTS

Figure 1:
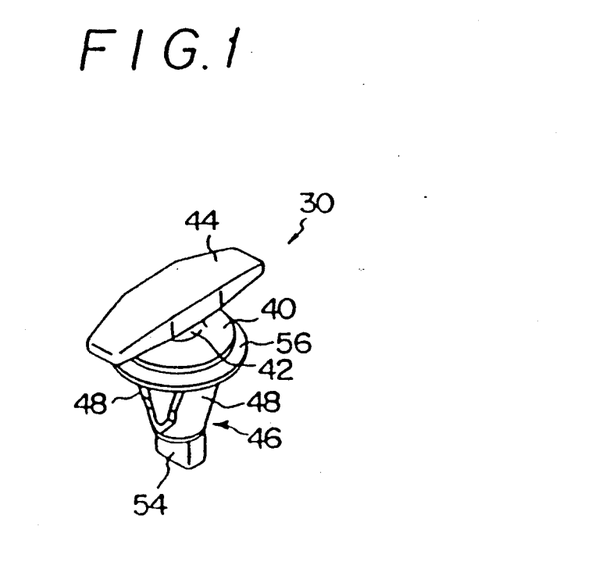
FIG. 1 is a perspective view of the clip.

FIGS. 1 to 5 illustrate a first embodiment of a clip according to the present invention in which: FIG. 1 shows a perspective view, FIG. 2(A) a front view, FIG. 2(B) an enlarged sectional view taken along line IIB—IIB in FIG. 2(A), FIG. 3 a bottom view of FIG. 2(A), FIG. 4 a plan view of FIG. 2(A), and FIG. 5 a left side view of FIG. 2(A), respectively. Note that the right side view of FIG. 2(A) and the rear view of FIG. 2(A) are the same as FIG. 5 and FIG. 2(A), respectively.

Figure 6:
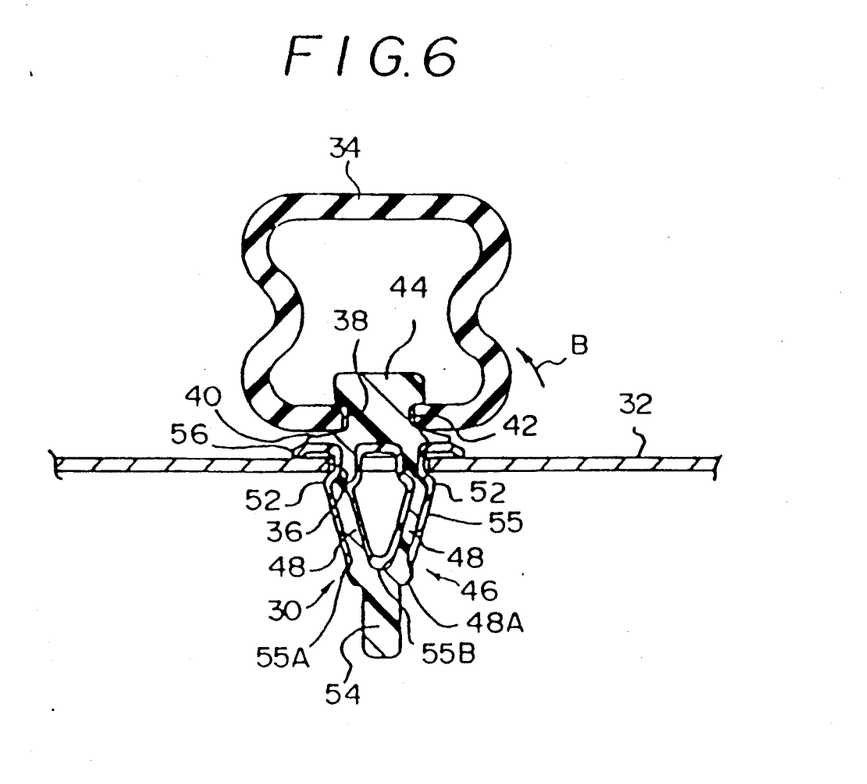
FIG. 6 is a sectional view showing a state where the clip is attached to a body panel.

In the first embodiment, as shown in FIG. 6, a clip 30 is attached to a body panel 32 as an attachment member and is employed for attaching a weather stripping 34 to the body panel 32. The body panel 32 has formed therein a circular through hole 36 for the attachment of the clip 30. Weather stripping 34, made of synthetic rubber, is formed into a substantially cylindrical shape, and has formed in its attachment portion onto the body panel 32 a circular through hole 38 for attachment of the clip 30.

The clip 30 is provided with a thin disk-like head 40, as shown in FIG. 1.

A substantially column-like insert portion 42 is formed to project upwardly from and coaxially with the head 40, and a rectangular plate-like lock portion 44 is formed at an upper end of the insert portion 42 substantially parallel to the head 40. By obliquely inserting the lock portion 44 into the through hole 38 in the weather stripping 34, the lock portion 44 is fitted in place past the through hole 38 so as to clamp a peripheral edge of the through hole 38 between the lock portion 44 and the head 40.

Figure 2A:
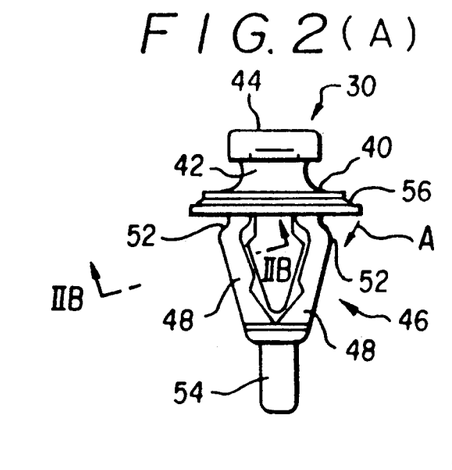
FIG. 2(A) is a front view of FIG. 1.

On the other hand, a leg 46 is extended downwardly from a lower surface of the head 40 substantially normal thereto, the leg 46 being inserted into the through hole 36 in the body panel 32 with a distal end of the leg directed ahead. The leg 46 comprises a pair of thin plate portions 48 extending over the area from an upper connecting portion with the head 40 to an intermediate portion in the direction of extension of the leg (or in the downward direction as seen in FIG. 2(A)).

Figure 2B:
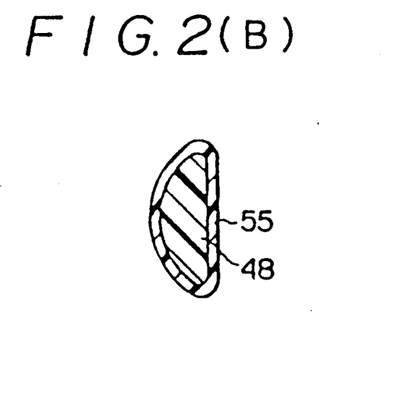
FIG. 2(B) is an enlarged sectional view taken along line IIB—IIB in FIG. 2(A)
Figure 3:
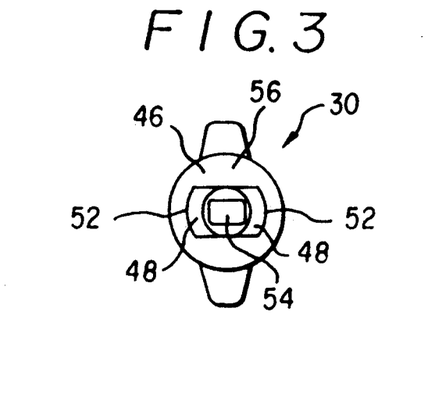
FIG. 3 is a bottom view of FIG. 2(A)
Figure 4:
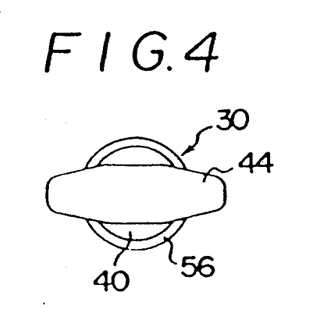
FIG. 4 is a plan view of FIG. 2(A)

The pair of plate portions 48 are each substantially semicircular in cross-section, as shown FIG. 2(B), and positioned opposite to each other with the axis of the head 40 lying therebetween. Further, the pair of plate portions 48 are bent in order to be spaced away from each other at their intermediate portions in the direction of the extension of the leg, as shown in FIG. 2(A), thereby forming a pair of pawls 52 which are positioned in the intermediate portion of the leg in the direction of the extension thereof so as to partially radially expand the outer periphery of the leg. The pawls 52 can pass through the through hole 36 in the plate portions 48 being elastically deformed to approach each other, so that after passage of the pawls 52 past the through hole 36, the plate portions 48 are allowed to revert to their original shape for clamping a peripheral edge of the through hole 36 between the pawls 52 and the head 40.

The pair of plate portions 48 progressively approach each other on the distal end side ranging downwardly from the pawls 52 in the direction of the extension of the leg, and finally connected at their distal ends to a shaft portion 54 of small diameter. Thus, the leg 45 is gradually reduced in its diameter at the distal end side ranging downwardly from the pawls 52 for easier insertion of the leg into the through hole 36.

In addition to the above construction of the leg 46, as shown in FIG. 6, a pair of thin-wall tubular surrounding portions 55 made of soft resin and immovable in the direction of extension of the leg are coated through secondary forming around the outer peripheries of the plate portions 48 over the areas ranging from the vicinity of connecting points of the plate portions 48 with the head 40 to the vicinity of connecting points thereof with the shaft portion 54. The surrounding portions 55 come into contact with the inner peripheral wall of the through hole 36, when the leg 46 is inserted into the through hole 36.

Figure 5:
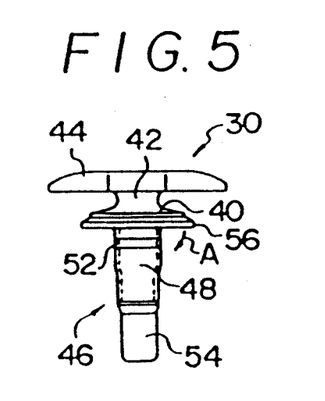
FIG. 5 is a left side view of FIG. 2(A)

The surrounding portions 55 have their intermediate parts coated around the outer peripheries of the pair of plate portions 48, and have their distal ends 55A held in abutment against radially expanded ledges 48A of the plate portions 48, respectively. Inner sides of the pair of distal ends 55A are interconnected together to form a connecting portion 55B. Further, as shown in FIG. 5, each of the plate portions 48 has a step formed in its intermediate part in the direction of the extension of the leg such that the width size of the plate portion 48 is smaller on the side near the distal end from the step than the side near the proximal end from the step. Each of the surrounding portions 55 is also reduced in width size at its intermediate part correspondingly, because it has a uniform thickness throughout. This arrangement is effective in preventing the relative movement between the surrounding portion 55 and the leg 46.

The surrounding portions 55 have continuously formed at their outer top ends a flange 56, made of soft resin, positioned just below the head 40 and projecting radially along the underside of the head 40 beyond the perimeter of the head 40 to a large extent. Upon the leg 46 being inserted into the through hole 36 in the body panel 32, the flange 56 comes into abutment against the surface of the body panel 32 and is held between the body panel 32 and the head 40. It is to be noted that the flange 56 is formed through secondary forming together with the surrounding portions 55, and is separate from the head 40 to be pliably deformed in the direction of arrow A in FIGS. 2(A) and 5.

The procedure of attaching the weather stripping 34 onto the body panel 32 by means of the clip 30 will now be described.

To begin with, the clip 30 is attached to the weather strip 34. By obliquely inserting the lock portion 44 into the through hole 38 in the weather strip 34 with one side end of the lock portion 44 directed ahead, the clip 30 is attached to the weather strip 34. Thus, the lock portion 44 is fitted in place past the through hole 38 to clamp the peripheral edge of the through hole 38 between the lock portion 44 and the head 40, whereby the clip 30 is attached to the weather strip 34.

Then, the clip 30 is attached to the body panel 32. By inserting the leg 46 into the through hole 36 in the body panel 32 with the distal end of the leg directed ahead, the clip 30 can be attached to the body panel 32. More specifically, the leg 46 is pushed into the through hole 36 while elastically deforming the plate portions 48 inwardly, until the pawls 52 pass just the through hole 36. During the insertion of the leg 46 into the through hole 36, the surrounding portions 55 are brought into contact with the inner peripheral wall of the through hole 36 to prevent the coating film on the inner peripheral wall from being damaged. Incidentally, although the shaft portion 54, with no surrounding portions 55 coated around its outer periphery, also passes through the through hole 36 when the leg 46 is inserted into the through hole 36, the shaft portion 54 has such a small diameter that it will not come into contact with the inner peripheral wall of the through hole 36.

As the leg 46 has penetrated the through hole 36, the plate portions 48 are restored to their original shape and the force to be applied to insert the leg 46 is reduced. Since the surrounding portions 55 around the leg 46 are immovable in the direction of the extension of the leg, the surrounding portions 55 are prevented from moving in the direction of the extension of the leg during the time the leg 46 is being inserted into the through hole 36. Hence it does not exert a large resistance against the insertion operation of the leg 46 into the through hole 36. Accordingly, upon the plate portions 48 being restored to their original shape, the force to be applied to insert the leg 46 into the through hole 36 is surely and greatly reduced so that a positive "click feeling" occurs when the insertion operation of the leg 46 is done.

Restoration of the plate portions 48 to their original shape causes the pawls 52 to clamp the peripheral edge of the through hole 36 between the pawls 52 and the head 40. Simultaneously, the flange 56 is held between the head 40 and the body panel 32 to prevent rain water or the like from entering the inner side of the body panel 32 through a gap between the clip 30 and the body panel 32 via the through hole 36.

As a result, the clip 30 is attached to the body panel 32 and the weather stripping 34 is in turn attached onto the body panel 32.

In a state where the clip 30 is attached to the body panel 32, if the clip 30 is subjected to a twisting or pinching force acting in the direction of arrow B in FIG. 6, the twisting force will deform the surrounding portion 55 in the depthwise direction of its wall, and hence the pawl 52 on one side would be displaced in the direction of disengaging from its state clamping the body panel 32. However, because of the surrounding portion 55 has a thin wall, the pawl 52 will never be disengaged from its state of being clamped to the body panel 32 even if it presses and deforms the surrounding portion 55. This results in the increase of strength of attachment of the clip 30 to the body panel 32.

Figure 7:
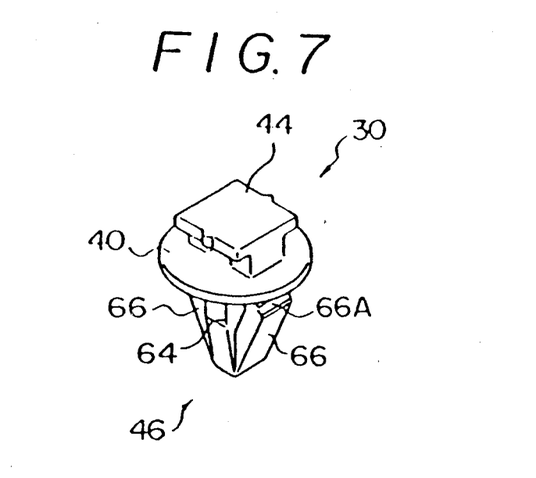
FIG. 7 is a perspective view of the clip.
Figure 8A:
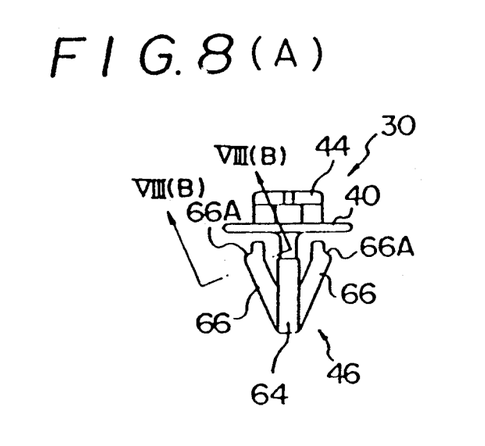
FIG. 8(A) is a front view of FIG. 7.
Figure 8B:
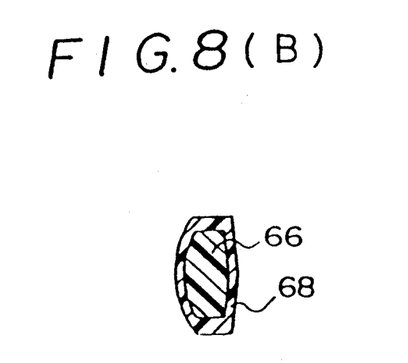
FIG. 8(B) is an enlarged sectional view taken along line VIII(B)—VIII(B) in FIG. 8(A)
Figure 9:
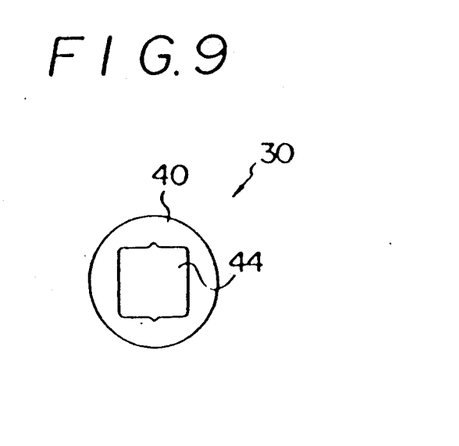
FIG. 9 is a plan view of FIG. 8(A)
Figure 10:
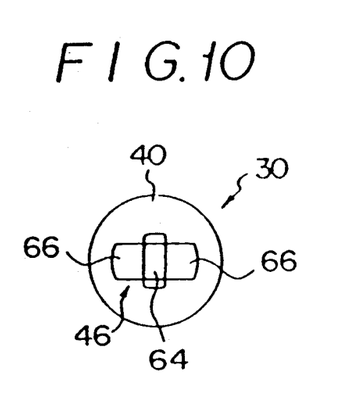
FIG. 10 is a bottom view of FIG. 8(A)

FIGS. 7 to 11 illustrate a second embodiment of a clip according to the present invention in which: FIG. 7 shows a perspective view, FIG. 8(A) a front view, FIG. 8(B) an enlarged sectional view taken along the line VIII(B)—VIII(B) in FIG. 8(A), FIG. 9 a plan view of FIG. 8(A), FIG. 10 a bottom view of FIG. 8(A), and FIG. 11 a left side view of FIG. 8(A), respectively. Note that the right side view of FIG. 8(A) and the rear view of FIG. 8(A) are the same as FIG. 11 and FIG. 8(A), respectively.

Figure 12:
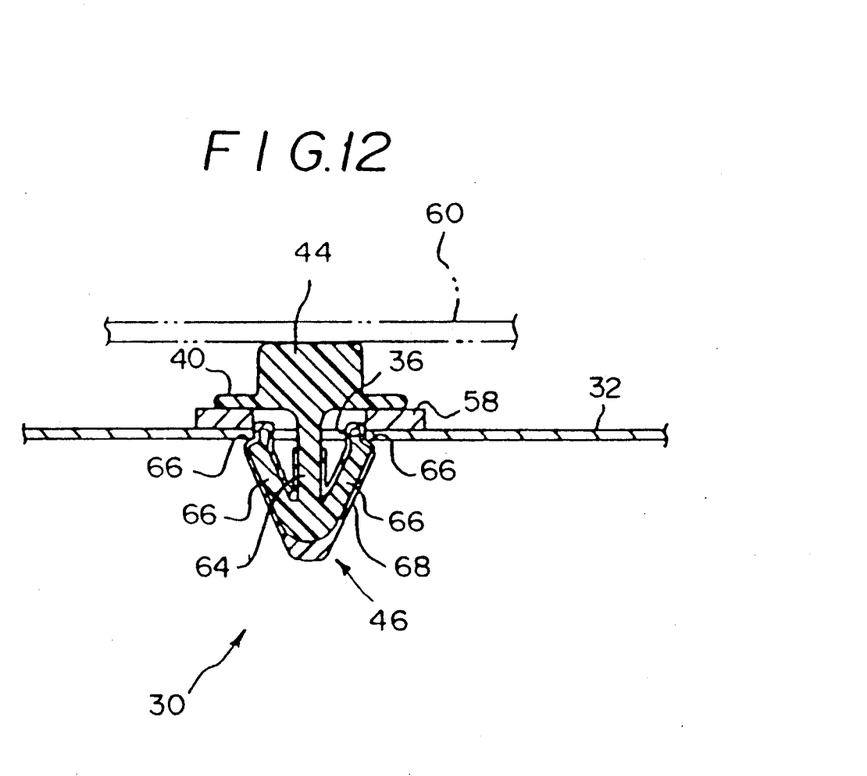
FIG. 12 is a sectional view showing a state where the clip is attached to a body panel.

In the second embodiment, as shown in FIG. 12, a clip 30 is attached to a body panel 32 through a packing 58 fitted around the leg 46. A louver 60 is in turn attached to a lock portion 44 of the clip 30. Thus, clip 30 is employed for attaching the louver 60 onto the body panel 32. The louver 60 can be attached to the lock portion 44 by means of pawls (not shown) projecting from a lower surface of the louver 60 and latched onto the lock portion 44.

The leg 46 comprises a plate portion 64 extending downwardly from the axial center of a head 40 substantially in a right angle to the underside of the head 40, and a pair of cantilevered arm-like pawls 66 each having a slender width and extending upwardly from a distal end of the plate portion 64 toward a proximal end thereof. The pawls 66 are each disposed on either side of the plate portion 64 opposite in depthwise direction of the plate portion, such that the leg 46 is radially expanded by the provision of the leg 46 in the depthwise direction of the plate portion 64. In other words, the pawls 66 are inclined with respect to the plate portion 64 in order to gradually expand the outer periphery of the leg 46 toward the proximal end of the leg. Steps 66A are formed near respective free distal ends of the pawls 66, and the pawls 66 have a smaller thickness in the areas near their distal ends from the steps 66A so as to converge the outer periphery of the leg 46. In such arrangement, the leg 46 upon being fully inserted into the through hole 36, the steps 66A of the pawls 66 are allowed to clamp the peripheral edge of the through hole 36 between the steps 66A and the head 40. Also, in a state where the pawls 66 are clamping the peripheral edge of the through hole 36, their distal end portions extended from the steps 66A of the pawls 66 are positioned within the through hole 36, whereby the base end side portion of the plate portion 64 is positioned at the center of the through hole 36, and hence prevented from coming into contact with the inner peripheral wall of the through hole 36.

In addition to the above construction of the leg 46, as shown in FIG. 12, a thin-wall surrounding portion 68 made of soft resin and immovable in the direction of extension of the leg is coated through a secondary forming around the outer periphery of the plate portion 64 over the area ranging from the distal end to the intermediate part thereof, as well as throughout the respective outer peripheries of the pawls 66.

More specifically, the surrounding portion 68 comprises one tubular section coated around the plate portion 64, and a pair of tubular sections coated around the respective pawls 66, the former and latter tubular sections being interconnected together at their distal ends. Unlike the surrounding portions 55 of the foregoing first embodiment, the distal end of the leg 46 is also coated with the interconnected part of those tubular sections.

Figure 11:
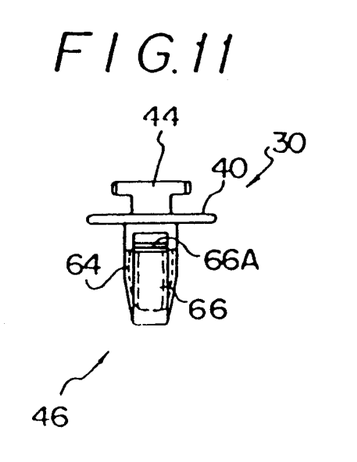
FIG. 11 is a left side view of FIG. 8(A)

As shown in FIG. 11, since each of the pawls 66 is uniform in width size, the width of the surrounding portion coated around the pawl is also uniform in size. And since the width size of plate portion 64 is made smaller toward its distal end, the surrounding portion 68 coated around plate portion 64 is also tapered with its outer periphery reduced toward the distal end correspondingly.

Therefore, and also in the second embodiment, the surrounding portion 68 comes into contact with the inner peripheral wall of the through hole 36, when the leg 46 is inserted into the through hole 36 for preventing damage of any rust-proof coating film on the inner peripheral wall of the through hole.

Further, since the surrounding portion 68 is thin and immovable in the direction of the extension of the leg, a positive click feeling occurs upon full insertion of leg 46 into the through hole 36, and the strength of attachment of the clip 30 to the body panel 32 is increased, as with the foregoing first embodiment.

What is claimed is:

1. An attachment clip for attaching an ornamental member to a wall member, said attachment clip comprising:

a head to which said ornamental member is attached and which is positioned on one side of said wall member;

a leg projecting integrally from said head and penetrating through said wall member, said leg having a pair of branched members extending from said head, said branched members being joined integrally at the distal ends thereof with the distal end portion of said leg, said end portion of said leg being directed ahead at the time of insertion;

a pawl provided on each of said branched members and radially expandable after penetration through said wall member to clamp said wall member between said pawls and said head for preventing said leg from slipping out of the wall member;

a thin-wall portion made of soft resin and formed around respective outer peripheries of said pawls and said leg to be relatively immovable in the direction of the extension of said leg, whereby said thin-wall portion comes into contact with an inner peripheral wall of a through hole in said wall member, when said leg is inserted into said through hole, for preventing damage of said through hole due to direct engagement of said leg against the inner peripheral wall of said through hole; and wherein the leg includes a raised member disposed between the thin-wall portion and the distal end of the leg.

2. An attachment clip as in claim 1 wherein the raised member is adjacent the thin-wall portion.

* * * * *